United States Patent [19]

Koni et al.

[11] 4,418,723
[45] Dec. 6, 1983

[54] FLOW RESTRICTOR

[75] Inventors: Tsuyoshi Koni; Yoshihisa Urushida, both of Tokorozawa, Japan

[73] Assignee: Citizen Watch Co., Ltd., Tokyo, Japan

[21] Appl. No.: 289,243

[22] Filed: Aug. 3, 1981

[30] Foreign Application Priority Data

Aug. 12, 1980 [JP] Japan ................. 55-110747

[51] Int. Cl.³ .............................. F15D 1/00; G01F 1/40
[52] U.S. Cl. ..................................... 138/42; 73/861.52
[58] Field of Search ........... 73/861.52, 861.53, 861.54; 138/40, 42

[56] References Cited

U.S. PATENT DOCUMENTS

| 1,459,925 | 6/1923 | Olin | 138/42 |
| 1,487,989 | 3/1924 | Vose | 73/861.52 |
| 1,734,026 | 10/1929 | Bijur | 138/42 |
| 2,069,630 | 2/1937 | Steenstrup | 138/42 |
| 2,091,792 | 8/1937 | Niesemann | 73/861.54 |
| 2,423,155 | 7/1947 | Phillips | 138/42 |
| 2,623,577 | 12/1952 | Cowles | 138/42 X |
| 2,683,973 | 7/1954 | Mettler | 138/42 X |
| 3,220,256 | 11/1965 | Weichbrod | 73/861.52 |
| 3,240,233 | 3/1966 | Johnston | 138/40 X |
| 3,253,459 | 5/1966 | Sorenson et al. | 73/861.54 X |

*Primary Examiner*—Herbert Goldstein
*Attorney, Agent, or Firm*—Koda and Androlia

[57] ABSTRACT

Improvements in a flow restrictor for use in a flowmeter measuring a flow rate according to the pressure drop caused by laminar flow, utilizing the fact that the pressure drop is proportional to the flow rate. The flow restrictor comprises a cylindrical member, and a housing having a fluid inlet and a fluid outlet for accommodating the cylindrical member, wherein at least one groove or spiral groove for passing fluid is formed in the peripheral direction of the cylindrical surface of the cylindrical member or in the peripheral direction of the inner surface of the housing forming a cylindrical cavity for accommodating the cylindrical member.

3 Claims, 17 Drawing Figures

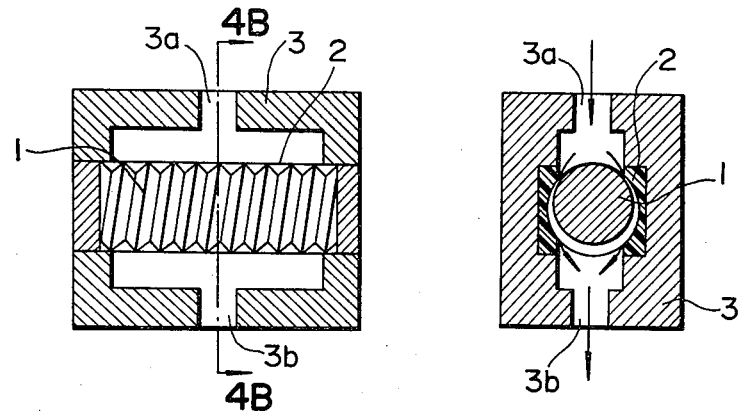
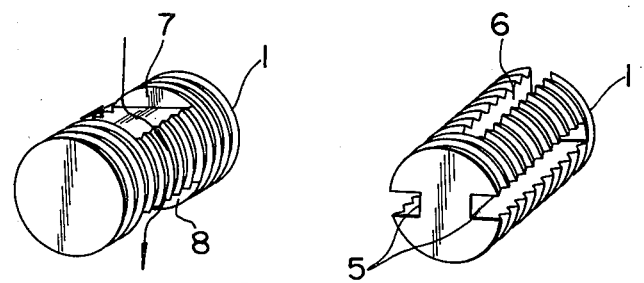
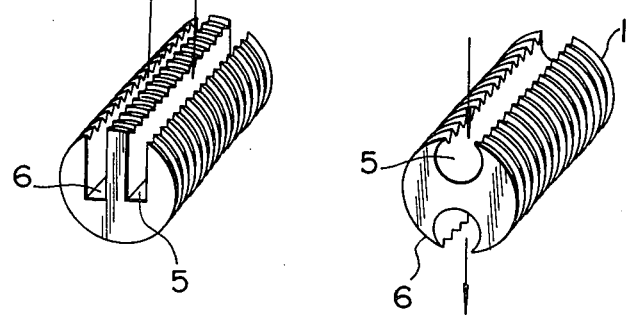

FLOW RESTRICTOR

BACKGROUND OF THE INVENTION

This invention relates to a flow restrictor for use in a flowmeter measuring the flow rate of fluid and, more particularly to an improved structure of a flow restrictor for use in a laminar flowmeter utilizing the pressure drop caused by laminar flow.

The laminar flowmeter is used to measure a flow rate according to the pressure drop, utilizing the phenomenon that when laminar fluid flows at a predetermined distance through a cylinder or between two planes, the pressure drop caused at the distance is substantially proportional to the volumetric flow rate of fluid which flows at the distance.

The flowmeter utilizing the above principle and the flow restrictor used therein are designed to comprise many thin passageways in order to obtain a sufficient quantity of laminar flow, for example, as explained in detail in U.S. Pat. No. 3,851,526 to Drexel. When it is desired to create a maximum possible pressure drop, each passageway should be formed as thin and elongate as possible. In conventional flowmeters, bundled thin pipes have been employed. In the above U.S. Pat. No. 3,851,526, further, there are disclosed a plurality of juxtaposed disks having a variety of complicated channels.

However, for the bundled pipes, it is difficult not only to manufacture each pipe but to secure the bundled pipes, resulting in increased costs. On the other hand, for the structure of a plurality of juxtaposed disks, each disk is complicated in manufacture and it is a troublesome procedure to arrange accurately the disks while positioning. These methods cost too much and are not suitable for mass production.

SUMMARY OF THE INVENTION

It is an object of the present invention to provide a flow restrictor characterized by a simple construction and high productivity.

In accordance with the present invention, there is provided a flow restrictor for use in a flowmeter utilizing the pressure drop caused by laminar flow comprising a cylindrical member, and a housing having a fluid inlet and a fluid outlet for accommodating the cylindrical member, at least one of the cylindrical member and the housing having at least one groove for passing fluid.

This simple construction does not necessitate manufacturing long pipes having uniform diameter or securing many bundled pipes in position. Further, it obviates the need of cutting channels for obtaining elongated passageways in one plane and eliminates the setting of plurality of disks, thereby enhancing the productivity.

BRIEF DESCRIPTION OF THE DRAWINGS

FIG. 4A is a longitudinal sectional view of a fourth embodiment illustrating the entire construction of the restrictor in accordance with the invention and FIG. 4B is a transverse sectional view of FIG. 4A, FIGS. 5A, 5B, 5C and 5D are perspective views of fifth, sixth, seventh and eighth embodiments, respectively illustrating a cylindrical member portion of the restrictor in accordance with the invention.

DETAILED DESCRIPTION

Referring now to the accompanying drawings, the exemplary embodiments of the invention will be explained.

Figure 1:
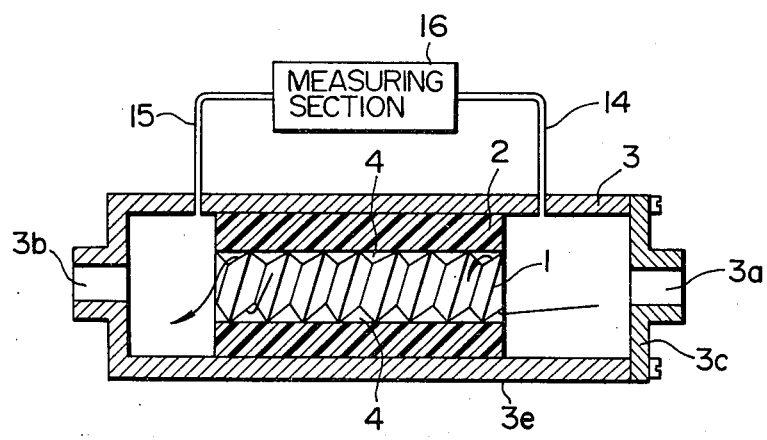
FIG. 1 is a longitudinal sectional view of a first embodiment illustrating the entire construction of the flow restrictor incorporating a cylindrical member, a housing and a sealing member in accordance with the invention.

In FIG. 1, a cylindrical member 1 having spiral or collar-shaped grooves in the cylindrical surface is held through a sealing member 2 within a housing 3 having a fluid inlet 3a and a fluid outlet 3b. The sealing member 2 is disposed in contact with or in close vicinity to the projections or ridges of the spiral grooves of the cylindrical member 1, thus forming passageways 4 between the sealing member 2 and the grooves. Therefore, in the direction of the arrows, the fluid introduced from the inlet 3a flows spirally along the passageways 4 and comes out of the fluid outlet 3b to the outside. The flow restrictor is inserted in the by-pass section of the fluid to be measured. Thin pipes 14 and 15 extend in parallel from the inlet side and the outlet side of the housing 3 and are connected to a measuring section 16 for measuring the flow rate.

As appear from FIG. 1, the cylindrical member 1 used in the flow restrictor is simple in construction and readily prepared merely by threading it spirally in the peripheral direction thereof. An end plate 3c having the inlet 3a is designed to be secured to a piping section 3e of the housing 3 by means of adhesives or screws. In assembly, the threaded cylindrical member 1 covered with the sealing member 2 is first placed into the cavity formed in the piping section 3e and then the end plate 3c is secured to the piping section 3e.

The restricting element 1 of the flow restrictor according to the present invention is simple in construction which is only threaded. Unlike the prior art, it is not necessary to secure many bundled thin pipes tightly or use many juxtaposed disks. As described above, the restrictor of the invention is easy to manufacture and assemble, thus providing a structure suitable for mass production.

Figures 2A, 2B:
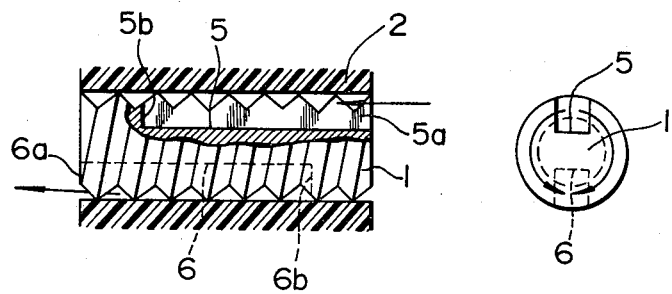
FIG. 2A is a partially sectional view of a second embodiment illustrating cylindrical member and sealing member portions of the flow restrictor in accordance with the invention and FIG. 2B is a right end view of FIG. 2A.

FIGS. 2A and 2B show the second embodiment. In this form of the invention, a housing and a sealing member are of the same construction as the housing 3 and the sealing member 2 in FIG. 1. In FIGS. 2A and 2B, the housing and a part of the sealing member are omitted. In this embodiment, the cylindrical member 1 of the type shown in FIG. 1 comprises an inlet channel 5 having an opening 5a at one end and a closed end 5b at the other end in the longitudinal direction for introducing the fluid and further comprises a similar outlet channel 6 having an opening 6a at one end and closed end 6b at the other for discharging the fluid. Thus, the channels 5 and 6 are made to increase the number of passageways 4 formed by the grooves in the cylindrical member 1, whereby all the flow rate of the fluid entering the inlet 3a and discharging from the outlet 3b is less restricted by the cylindrical member 1 than in the embodiment of FIG. 1.

Figure 3:
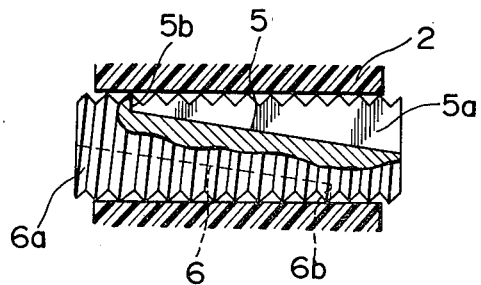
FIG. 3 is a sectional view of a third embodiment illustrating cylindrical member and sealing member portions of the flow restrictor in accordance with the invention.

FIG. 3 illustrates the third embodiment of the invention in which the shape of the inlet channel 5 cut in the cylindrical member 1 of FIGS. 2A and 2B is varied so that it has a deeper opening 5a and is reduced in depth as the closed end 5b is being approached. Similarly, the shape of the outlet channel 6 is varied so that it has a deeper opening 6a and is reduced in depth as the closed end 6b is being approached, whereby all the flow rate is less restricted by the configurations of the channels 5 and 6 than in the embodiment of FIGS. 2A and 2B.

In FIGS. 4A and 4B, there is illustrated the fourth embodiment in which an inlet 3a and an outlet 3b of the abovementioned housing 3 are formed substantially perpendicular to the longitudinal direction of the cylindrical member 1. Fluid enters the inlet 3a, passes through many thread grooves in the cylindrical member 1 and then comes out of the outlet 3b.

FIGS. 5A, 5B, 5C and 5D show modified embodiments of various shapes of the inlet channel 5 and the outlet channel 6 in the cylindrical member 1. The cylindrical member 1 includes many grooves or spiral grooves in the peripheral direction of the cylindrical surface.

In the fifth embodiment of FIG. 5A, a cylindrical member 1 is held within a housing (not shown) of the type shown in the fourth embodiment of FIGS. 4A and 4B and further includes a notch 7 in the cylindrical surface opposite to an inlet of the housing (not shown) and a notch 8 in the cylindrical surface opposite to an outlet of the housing (not shown). In the direction of the arrows, the fluid introduced from the inlet of the housing (not shown) enters the notch 7, passes through many grooves in the cylindrical surface, reaches the notch 8 and then comes out of the outlet of the housing (not shown). In this embodiment, each area of the notch 7, 8 is readily formed to a desired size by varying the axial length thereof, providing easily a predetermined flow rate.

In the sixth embodiment of FIG. 5B, a cylindrical member 1 is placed in a housing (not shown) of the type shown in FIG. 1 and includes two inlet channels 5 and two outlet channels 6. This embodiment permits more flow rate than the second embodiment of FIGS. 2A and 2B.

FIG. 5C is the seventh embodiment in which the opposite ends of a cylindrical member 1 are covered with end plates (not shown). The cylindrical member 1 is accommodated in a housing (not shown) having an inlet and an outlet (not shown) substantially perpendicular to the axis thereof and is adapted to make the fluid U-turns to change direction. This embodiment permits the channels to increase in width as well as in length in the peripheral direction of the cylindrical member 1 to assure a sufficient pressure difference. Also the cylindrical member 1 in this embodiment permits use in the housing of FIG. 1 by covering both ends of channels with respective end plates.

In the eighth embodiment of FIG. 5D, channels 5 and 6 in the axial direction of the cylindrical member 1 are formed arc in cross-section. Both ends of the cylindrical member 1 are covered with closed end plates (not shown). In this case, since sufficient spaces are given in the cylindrical member 1, it eliminates the need of the spaces between the cylindrical member 1 and the inlet 3a of FIGS. 4A and 4B and between the cylindrical member 1 and the outlet 3b of the same, for convenience in cutting operation. The cylindrical member 1 is also placed in the housing of the type illustrated in FIG. 1, when each one end of the respective channels is covered with each end plate.

As stated above, the width, depth, length of the channels 5 and 6 are modified according to the introducing direction of fluid and all the flow rate, and various shapes other than those illustrated herein are of course possible.

Figure 6A:
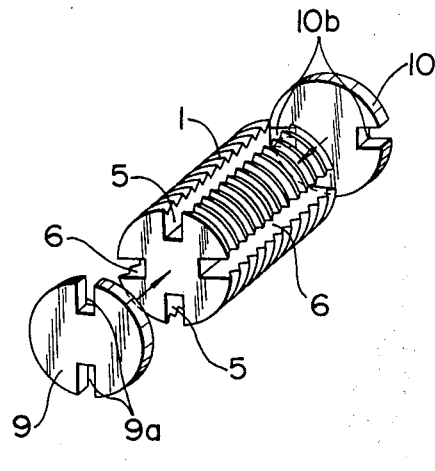
FIGS. 6A and 6B are perspective views of a ninth embodiment illustrating a cylindrical member having end plates of the restrictor in accordance with the invention.
Figure 6B:
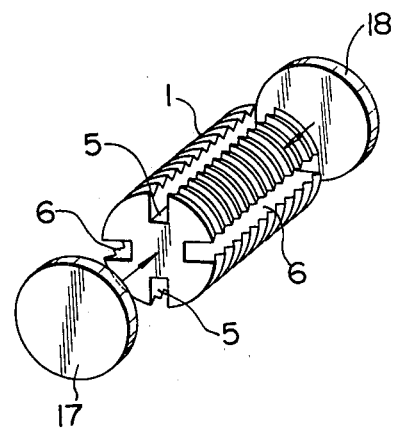

In FIG. 6A, from a production standpoint, the channels 5 and 6 in the cylindrical member 1 are formed endless and end plates 9 and 10 each having necessary inlets 9a and outlets 10b are adhered or screwed to the ends of the cylindrical member 1. FIG. 6B is the embodiment in which end plates 17 and 18 are of closed shape and it can be accommodated in the housing of the type in FIGS. 4A and 4B. These end plates 17 and 18 are also used for the embodiments of FIGS. 5C and 5D.

Figure 7:
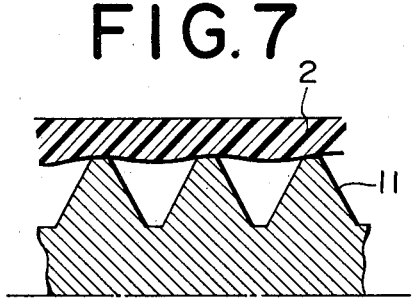
FIGS. 7 to 10 are partially sectional views of the tenth to thirteenth embodiments, respectively showing the relationship between a cylindrical member and a sealing member of the flow restrictor in accordance with the invention.

FIG. 7 through FIG. 10 show the relationship between an external thread 11 formed by the spiral grooves in the peripheral direction of the cylindrical member 1 and a sealing member 2. In the embodiment of FIG. 7, the sealing member 2 is made of an elastic material such as rubber, plastics and the like. In this way, the sealing member 2 is made into contact with the external thread 11 of the cylindrical member 1 to form the passageways 4 for passing the fluid.

Figure 8:
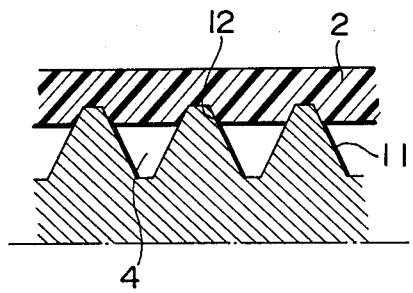

In the embodiment of FIG. 8, the sealing member 2 comprises an internal thread whose crests are cut off, thereby forming passageways for directing the fluid.

Figure 9:
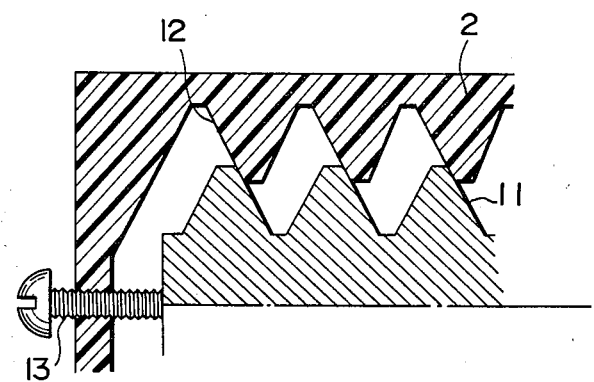

In the twelfth embodiment of FIG. 9, the sealing member 2 comprises an internal thread 12 which is the same in the number of threads and pitch but somewhat larger in effective diameter in comparison with an external thread 11 and has a somewhat smaller minor diameter than the full diameter of the external thread 11. They are secured by means of a set screw 13 so that contact is made between each crest of the external thread 11 and that of the internal thread 12.

Figure 10:
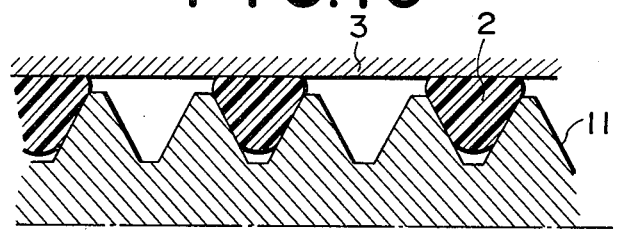

In the thirteenth embodiment of FIG. 10, the external thread 11 is a double thread and a string sealing member 2 is wound around every other thread root thereof.

In any of the above embodiments, the fluid pressure is relatively low, several tens mm H2O, thus assuring a good sealing effect.

Figure 11:
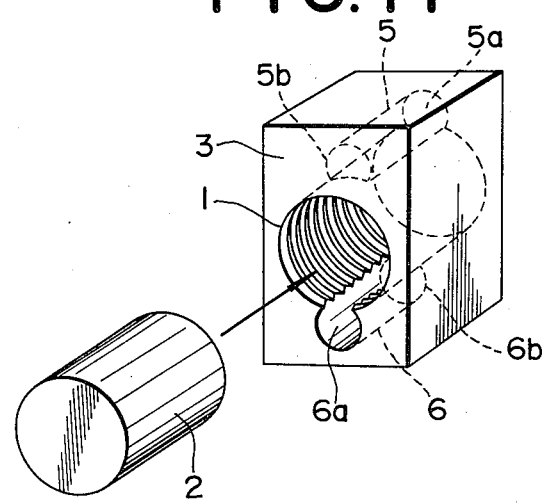
FIG. 11 is a perspective view of a fourteenth embodiment illustrating a housing having at least one groove of the flow restrictor in accordance with the invention.

In the fouteenth embodiment of FIG. 11, there is shown a cylindrical sealing member 2 and a housing 3 for accommodating the member 2. The housing 3 is threaded in the inner surface for accommodating the cylindrical sealing member 2 and comprises an inlet channel 5 and an outlet channel 6. The sealing member 2 is made of the above elastic material such as rubber and plastics and the channels 5 and 6 are formed with closed ends 5b and 6b as mentioned above.

As explained heretofore in accordance with various embodiments, the present invention provides a flow restrictor which is characterized by a simple construction and high productivity and is suitable for obtaining accurately a predetermined amount of the flow.

What is claimed is:

1. A flow restricter for use in a flowmeter utilizing pressure drop caused by laminar flow comprising a cylindrical member, and a housing having a fluid inlet and a fluid outlet for accommodating said cylindrical member comprising at least one groove disposed spriral in the peripheral direction of the cylindrical surface thereof, at least one endless inlet channel, at least one endless outlet channel in the longitudinal direction thereof and end plates secured to the ends thereof, one of said plates having at least one inlet opening corresponding to said at least one endless inlet channel and the other of said plates having at least one outlet opening corresponding to said at least one endless outlet channel.

2. The flow restrictor according to claim 1 further comprising a sealing member, said sealing member being disposed between said cylindrical member and said housing.

3. The flow restrictor according to claim 2 wherein said sealing member is made of an elastic material such as rubber and plastics.

* * * * *